(12) United States Patent
Gkoulalas-Divanis (10) Patent No.: US 11,036,884 B2
(45) Date of Patent: *Jun. 15, 2021

(54) ITERATIVE EXECUTION OF DATA DE-IDENTIFICATION PROCESSES

(71) Applicant: International Business Machines Corporation, Armonk, NY (US)

(72) Inventor: Aris Gkoulalas-Divanis, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 241 days.

This patent is subject to a terminal disclaimer.

(21) Appl. No.: 15/905,112

(22) Filed: Feb. 26, 2018

(65) Prior Publication Data

US 2019/0266353 A1  Aug. 29, 2019

(51) Int. Cl.
*G06F 21/62* (2013.01)
*G06F 21/60* (2013.01)

(52) U.S. Cl.
CPC ........ *G06F 21/6254* (2013.01); *G06F 21/602* (2013.01)

(58) Field of Classification Search
CPC .......................... G06F 21/6254; G06F 21/602
See application file for complete search history.

(56) References Cited

U.S. PATENT DOCUMENTS

| | | | |
|---|---|---|---|
| 8,577,933 B2 | 11/2013 | Evenhaim | |
| 9,129,117 B2 | 9/2015 | Chen et al. | |
| 9,129,133 B2 | 9/2015 | LaFever et al. | |
| 9,292,707 B1* | 3/2016 | Fontecchio | H04L 63/0876 |
| 9,323,948 B2 | 4/2016 | Gupta et al. | |
| 10,403,392 B1* | 9/2019 | Chandrasekaran | G16H 10/60 |
| 2002/0169793 A1* | 11/2002 | Sweeney | G06F 21/6245 |
| 2008/0240425 A1* | 10/2008 | Rosales | G06F 21/6254 |
| | | | 380/28 |
| 2010/0042583 A1* | 2/2010 | Gervais | G06F 21/6254 |
| | | | 707/757 |
| 2010/0114920 A1* | 5/2010 | Srivastava | G06F 21/6254 |
| | | | 707/757 |

(Continued)

OTHER PUBLICATIONS

Trabelsi, Slim; Salzgeber, Vincent; Bezzi, Michele; Montagnon, Gilles; "Data Disclosure Risk Evaluation", Fourth International Conference on Risks and Security of Internet and Systems (CRISIS), IEEE, Oct. 19-22, 2009, pp. 35-42.*

(Continued)

*Primary Examiner* — Victor Lesniewski
(74) *Attorney, Agent, or Firm* — Will Stock; Edell, Shapiro & Finnan, LLC (57) ABSTRACT

A computer system de-identifies data by selecting one or more attributes of a dataset and determining a set of data de-identification techniques associated with each attribute. Each de-identification technique is evaluated with respect to an impact on data privacy and an impact on data utility based on a series of metrics, and a data de-identification technique is recommended for each attribute based on the evaluation. The dataset is de-identified by applying the de-identification technique that is recommended for each attribute. Embodiments of the present invention further include a method and program product for de-identifying data in substantially the same manner described above.

14 Claims, 7 Drawing Sheets

(56) References Cited

U.S. PATENT DOCUMENTS

| | | | | |
|---|---|---|---|---|
| 2010/0332537 | A1* | 12/2010 | El Emam | G06F 16/2457 707/771 |
| 2012/0151597 | A1* | 6/2012 | Gupta | G06F 21/6254 726/26 |
| 2013/0033073 | A1* | 2/2013 | Gendell | A47C 4/28 297/16.1 |
| 2013/0080398 | A1* | 3/2013 | Booth | G06F 21/6254 707/687 |
| 2013/0133073 | A1* | 5/2013 | El Emam | G06F 21/6254 726/25 |
| 2014/0189858 | A1* | 7/2014 | Chen | G06F 21/577 726/22 |
| 2015/0007249 | A1* | 1/2015 | Bezzi | G06F 21/6227 726/1 |
| 2015/0154404 | A1* | 6/2015 | Patel | H05B 47/18 726/26 |
| 2015/0213226 | A1* | 7/2015 | Wolniewicz | G16H 10/60 705/3 |
| 2016/0292455 | A1* | 10/2016 | Jebara | G06F 16/9535 |
| 2016/0315925 | A1 | 10/2016 | Lowenberg et al. | |
| 2016/0342812 | A1* | 11/2016 | Lynch | H04L 63/0407 |
| 2017/0103232 | A1* | 4/2017 | Scaiano | G06F 21/6254 |
| 2017/0124351 | A1* | 5/2017 | Scaiano | G06F 21/6254 |
| 2017/0177907 | A1* | 6/2017 | Scaiano | G06F 21/6254 |
| 2017/0208041 | A1 | 7/2017 | Kho et al. | |
| 2017/0243028 | A1* | 8/2017 | LaFever | G06F 21/6254 |
| 2018/0004978 | A1* | 1/2018 | Hebert | G06F 16/2457 |
| 2018/0025179 | A1* | 1/2018 | Antonatos | G06F 21/6254 726/27 |
| 2018/0082082 | A1* | 3/2018 | Lowenberg | G06F 21/602 |
| 2018/0114037 | A1* | 4/2018 | Scaiano | G06F 21/604 |
| 2018/0137149 | A1* | 5/2018 | Hsiao | G06F 16/215 |
| 2018/0218173 | A1* | 8/2018 | Perkins | H04L 63/0421 |
| 2019/0026490 | A1* | 1/2019 | Ahmed | G06F 21/6254 |
| 2019/0057225 | A1* | 2/2019 | Thomas | G06N 20/00 |
| 2019/0228183 | A1* | 7/2019 | Choi | G06F 16/00 |
| 2019/0303618 | A1 | 10/2019 | Gkoulalas-Divanis | |
| 2020/0162500 | A1* | 5/2020 | Ciocarlie | H04L 63/20 |

OTHER PUBLICATIONS

Chen, Kang-Cheng; Yu, Chia-Mu; Tai, Bo-Chen; Li, Szu-Chuang; Tsou, Yao-Tung; Huang, Yennun; Lin, Chia-Ming; "Data-Driven Approach for Evaluating Risk of Disclosure and Utility in Differentially Private Data Release", Advanced Information Networking and Applications, IEEE, Mar. 27-29, 2017, pp. 1130-1137.*

Almasi, M. Moein; Siddiqui, Taha R.; Mohammed, Noman; Hemmati, Hadi; "The Risk-Utility Tradeoff for Data Privacy Models", 8th IFIP International Conference on New Technologies, Mobility and Security (NTMS), IEEE, Nov. 21-23, 2016, 5 pages.*

Prasser, Fabian; Eicher, Johanna; Bild, Raffael; Spengler, Helmut; Kuhn, Klaus A.; "A Tool for Optimizing De-Identified Health Data for Use in Statistical Classification", 30th International Symposium on Computer-Based Medical Systems (CBMS), IEEE, Jun. 22-24, 2017, pp. 169-174.*

Kao, Chiun-How; Hsieh, Chih-Hung; Chu, Yu-Feng; Kuang, Yu-Ting; "Using Data Visualization Technique to Detect Sensitive Information Re-identification Problem of Real Open Dataset", International Computer Symposium (ICS), IEEE, Dec. 15-17, 2016, pp. 330-334.*

List of IBM Patents or Patent Applications Treated as Related, filed Jun. 20, 2019.

Disclosed Anonymously, "Method and Apparatus for Cloud Bursting with Dynamic Data De-Identification", http://ip.com/IPCOM/000240534D, Feb. 2015, 3 pages.

Disclosed Anonymously, "De-identify Sensitive Information from ETL Job Design and Diagnostic Information", http://ip.com/IPCOM/000238009D, Jul. 2014, 7 pages.

Disclosed Anonymously, "A Risk Management Framework for Securely Sharing Anonymized Data While Preserving Individual Privacy", http://ip.com/IPCOM/000204564D, Mar. 2011, 3 pages.

Nelson, "Practical Implications of Sharing Data: A Primer on Data Privacy, Anonymization, and De-Identification", Google, ThotWave Technologies, Chapel Hill, NC.; Paper 1884-2015, 2015, 23 pages.

* cited by examiner

ITERATIVE EXECUTION OF DATA DE-IDENTIFICATION PROCESSES

BACKGROUND

1. Technical Field

Present invention embodiments relate to data de-identification, and more specifically, to multiple different de-identification processes iteratively executing to de-identify data.

2. Discussion of the Related Art

Data de-identification or anonymization refers to the practice of transforming features in data in order to prevent a person's identity from being linked to other information about the person. Data is commonly de-identified in order to make use of the data while preserving the privacy of individuals. For example, medical data may be de-identified before it is used for clinical research purposes. Data utility, or usefulness of the data, generally decreases as that data is further de-identified. Thus, there is typically a balance between data privacy and data utility.

Data owners are increasingly interested in knowing how their data is being transformed in order to meet de-identification or anonymization requirements. Furthermore, data owners are interested in knowing which algorithms best strike a balance between ensuring de-identification or anonymization, while also preserving data utility.

SUMMARY

According to one embodiment of the present invention, a computer system de-identifies data by selecting one or more attributes of a dataset and determining a set of data de-identification techniques associated with each attribute. Each de-identification technique is evaluated with respect to an impact on data privacy and an impact on data utility based on a series of metrics, and a data de-identification technique is recommended for each attribute based on the evaluation. The dataset is de-identified by applying the de-identification technique that is recommended for each attribute. Embodiments of the present invention further include a method and program product for de-identifying data in substantially the same manner described above.

BRIEF DESCRIPTION OF THE DRAWINGS

Generally, like reference numerals in the various figures are utilized to designate like components.

DETAILED DESCRIPTION

Present invention embodiments relate generally to data de-identification, and more specifically, to optimizing the data de-identification process by executing multiple different de-identification processes to iteratively de-identify data. Personal data, or personally identifiable information (PIT), includes data that potentially identifies a specific person or entity. Data de-identification involves transforming identifying features, such as direct identifiers and quasi-identifiers, in a dataset so that they can no longer be used for re-identification attacks. Direct identifiers may immediately identify individuals without requiring any other information. For example, direct identifiers may include a full name, social security number, or address. Quasi-identifiers are data attributes that, unlike direct identifiers, cannot be used alone to re-identify individuals. However, when quasi-identifier attributes are used together, the combinations of values of the quasi-identifier attributes in the dataset may be unique for some individuals, leading to their re-identification. For example, the combination of values for attributes "five-digit zip code", "gender", and "date of birth" is unique for a large number of United States citizens, hence these attributes may be used together to issue successful re-identification attacks.

Due to various privacy regulations and other requirements there are many different approaches to de-identifying data to facilitate secondary uses. However, as a dataset's degree of de-identification increases, its utility decreases. Embodiments of the present invention evaluate a dataset in order to apply de-identification techniques that offer the highest level of privacy protection at the least expense to data utility. By iterating this process with different de-identification processes, a dataset may achieve a high level of anonymization while preserving its utility. Embodiments of the present invention efficiently achieve de-identification (since de-identification techniques are selected based on their evaluation/score and applied successively), thereby saving computing resources such as processing power and memory by quickly arriving at the de-identification results that are desired while preserving data utility.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussions of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
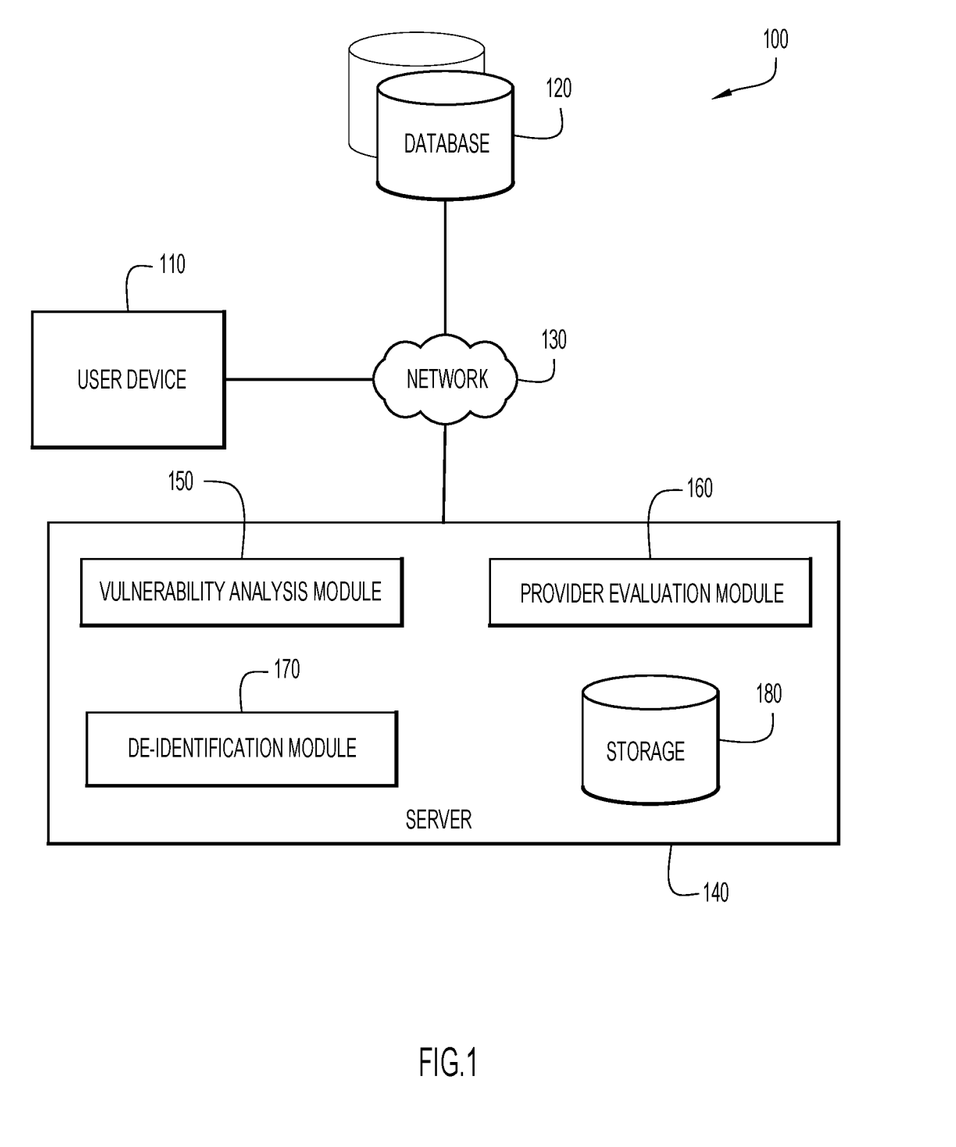
FIG. 1 is a block diagram depicting a computing environment for data de-identification in accordance with an embodiment of the present invention.

Present invention embodiments will now be described in detail with reference to the Figures. FIG. 1 is a block diagram depicting a computing environment 100 for data de-identification in accordance with an embodiment of the present invention. As depicted, computing environment 100 includes user device 110, database 120, network 130, server 140, vulnerability analysis module 150, provider evaluation module 160, de-identification module 170, and storage 180.

User device 110 may include a laptop computer, a tablet computer, a netbook computer, a personal computer (PC), a desktop computer, a personal digital assistant (PDA), a smart phone, a thin client, or any programmable electronic device capable of executing computer readable program instructions. A user of user device 110 may provide initial datasets to be de-identified to database 120 or server 140. A user may also interact with de-identified data using device 110. In some embodiments, the user of user device 110 is the owner of one or more datasets that are de-identified according to embodiments of the subject invention. User device 110 may include internal and external hardware components, as depicted and described in further detail with respect to FIG. 5. In some embodiments, a data owner may interact with server 140 using user device 110 to view evaluations of de-identification providers and to make selections regarding the de-identification process.

Database 120 may include any non-volatile storage media known in the art. For example, database 120 can be implemented with a tape library, optical library, one or more independent hard disk drives, or multiple hard disk drives in a redundant array of independent disks (RAID). Similarly, data on database 120 may conform to any suitable storage architecture known in the art, such as a file, a relational database, an object-oriented database, and/or one or more tables.

Database 120 may include data that is considered publicly-available and/or private (e.g., proprietary data belonging to one or more data owners). Data in database 120 may include data that has not yet been de-identified or data that has been de-identified according to one or several standards. A user (such as a data owner) may interact with data stored on database 120 via user device 110.

Network 130 may include a local area network (LAN), a wide area network (WAN) such as the Internet, or a combination of the two, and include wired, wireless, or fiber optic connections. In general, network 130 can be any combination of connections and protocols that will support communications between user device 110, database 120, and server 140 in accordance with embodiments of the present invention.

Server 140 may include vulnerability analysis module 150, provider evaluation module 160, de-identification module 170, and storage 180. In general, server 140 and its modules may select attributes in a dataset by performing a vulnerability analysis, select de-identification providers for each attribute, evaluate the selected providers with respect to their degree of de-identification and effect on data utility, and de-identify the dataset using one or more providers. Server 140 may include internal and external hardware components, as depicted and described in further detail with respect to FIG. 5.

Vulnerability analysis module 150 may analyze attributes of data in a dataset in order to discover potentially identifying information. Vulnerability analysis module 150 may automatically identify direct identifiers and quasi-identifiers in data, as well as sensitive attributes, such as a person's salary, medical history, and the like. Vulnerability analysis module 150 may seek and identify vulnerabilities on the basis of particular privacy regulations, guidelines, or other standards to which the de-identified data is expected to adhere. In some embodiments, vulnerability analysis module 150 finds identifiers by determining how data might be vulnerable to particular re-identification attacks, sensitive information disclosure attacks, membership disclosure attacks, inference attacks, or other exploits. A data owner may also indicate direct identifiers, quasi-identifiers, and/or sensitive attributes in a dataset.

Provider evaluation module 160 may associate each attribute identified by vulnerability analysis module 150 with one or more de-identification providers. Each de-identification provider may be a particular process for de-identifying or anonymizing data. For example, a de-identification provider may be a data masking algorithm for protecting email or postal addresses of individuals, or a data generalization method for abstracting data values related to individuals such as dates, diagnosis codes, purchased items, etc. Each de-identification provider may further be evaluated according to its configuration options. For example, a de-identification provider for dates may transform a specific date to a month and year, to a year, or to an interval of years. Each of these configuration options of the same de-identification provider may be evaluated by provider evaluation module 160 to determine a separate value for disclosure risk and data utility for each configuration option. For example, generalizing a date of birth value to a year value can significantly reduce privacy risk, but may also have a high impact on data utility, as several medical studies cannot be performed when date of birth is reduced to a year birth granularity.

Once provider evaluation module 160 associates the identified attributes with one or more de-identification providers, provider evaluation module 160 may evaluate the associated providers with respect to the disclosure risk and data utility. Of the selected de-identification providers, one or more will be chosen, and applied to the dataset by de-identification module 170. In some embodiments, provider evaluation module 160 automatically chooses a de-identification provider to apply to the dataset; for example, provider evaluation module 160 may select a de-identification provider (and respective configuration options) that is the most beneficial in terms of privacy and utility. In other embodiments, provider evaluation module 160 displays an evaluation of recommended de-identification providers to a user, such as a data owner, who may then select a de-identification provider to apply to the dataset.

De-identification module 170 applies de-identification providers to datasets in order to de-identify data. In particular, de-identification module 170 uses de-identification providers to protect direct and quasi-identifiers in datasets, so that they can no longer be used for performing re-identification attacks. Additionally, de-identification module 170 may protect sensitive attributes in a dataset, such as medical history or salary, from being accurately mapped to the corresponding individuals. De-identification module 170 may apply one or more de-identification providers that are selected by provider evaluation module 160 or by a user. De-identification module 170 may output de-identified data to storage 180 or database 120.

Storage 180 may include any non-volatile storage media known in the art. For example, storage 180 can be implemented with a tape library, optical library, one or more independent hard disk drives, or multiple hard disk drives in a redundant array of independent disks (RAID). Similarly, data stored in storage 180 may conform to any suitable storage architecture known in the art, such as a file, a relational database, an object-oriented database, and/or one or more tables. A data owner may upload a dataset to storage 180 for de-identification. Storage 180 may store algorithms used by vulnerability analysis module 150 for identifying direct identifiers, quasi-identifiers, and sensitive attributes. Storage 180 may store de-identification providers for use by provider evaluation module 160 and de-identification module 170. In some embodiments, de-identified data is output to storage 180.

Figure 2:
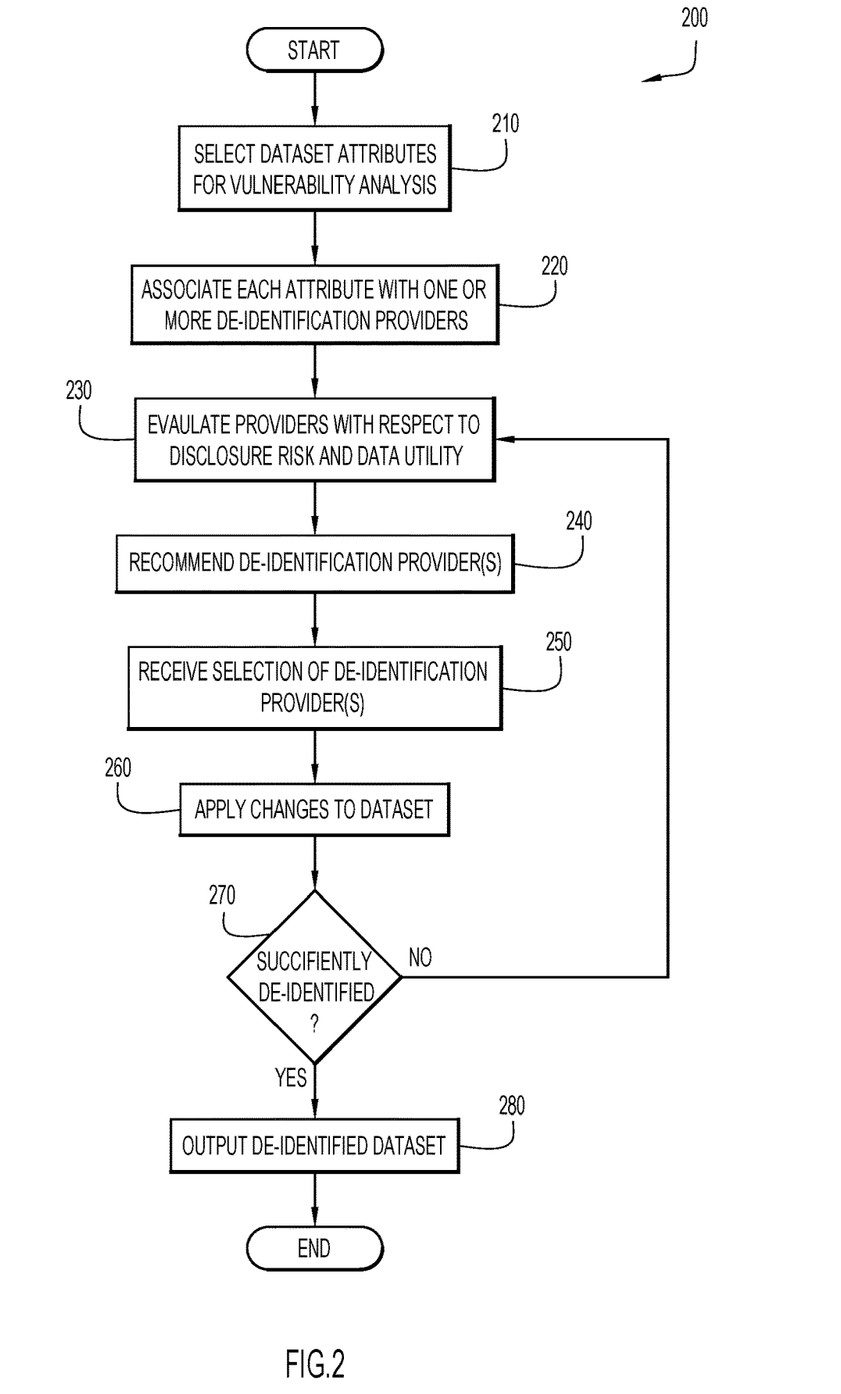
FIG. 2 is a flow chart depicting a method of de-identifying data in accordance with an embodiment of the present invention.

FIG. 2 is a flow chart depicting a method 200 of de-identifying data in accordance with an embodiment of the present invention.

Dataset attributes are selected for a vulnerability analysis at operation 210. Attributes of a dataset may include any data and features thereof that could potentially contain personally identifiable information. Vulnerability analysis module 150 may scan a dataset's attributes for direct identifiers, quasi-identifiers, and sensitive attributes. Vulnerability analysis module 150 may discover quasi-identifiers by searching for combinations of attributes that together describe a single individual. In some embodiments, a user, such as a data owner, indicates the attributes that are direct identifiers, or quasi-identifiers, or sensitive attributes.

Each data attribute is associated with one or more de-identification providers at operation 220. Provider evaluation module 160 may select de-identification providers that are appropriate for de-identifying the data attributes selected in operation 210. Multiple de-identification providers may be associated with an attribute, as there can be more than one approach to de-identifying a particular data attribute. For example, a de-identification provider that generalizes dates by converting a date to a month and year, and de-identification provider that generalizes dates by converting a date to a year only, may both be associated with an attribute that is a date. A de-identification provider may also have several configuration options associated with an attribute. For example, if the attribute is a name, a de-identification provider may have configuration options to process the name by simply replacing the name with a randomly-selected name, replacing the name with another name associated with the same gender, processing name with a one-way hash provider (such as SHA-512) to generate a unique alphanumeric value for the name, etc.

For direct identifiers, the de-identification providers applied may include data masking techniques, data pseudonymization techniques, data encryption and hashing techniques. Data masking providers may obfuscate data by replacing the original data values with fictionalized values such that the dataset remains structurally similar, but is inauthentic. For quasi-identifiers, the de-identification providers may perform an anonymization technique that is based on data generalization and/or suppression operations, such as applying an algorithm that offers privacy guarantees following a formal privacy model like k-anonymity or l-diversity, among many others. Data generalization refers to the process of abstracting original data values in order to decrease their specificity. For example, a birth date may be generalized to a month and year, and further generalized to simply a year. Similarly, a telephone number may be a ten-digit number (e.g., 123-456-7890), which may be generalized to an area code and telephone prefix (e.g. 123-456-XXXX), and further generalized to the area code only (e.g., area code 123). Data suppression refers to the process of deleting data values. In some embodiments, data suppression is performed only when data generalization cannot adequately de-identify a dataset.

Each de-identification provider, including its supported configuration options, is evaluated with respect to its effects on data privacy and data utility at operation 230. In general, a degree of de-identification generally has an inverse relationship to data utility; for example, a completely redacted document has no risk of containing identifying information, but such a document has no utility. Provider evaluation module 160 may evaluate all available de-identification providers (and configuration options thereof), the de-identification providers selected at operation 220, or a subset of those selected de-identification providers. A data owner may use user device 110 to view the evaluations of provider evaluation module 160.

De-identification providers may be evaluated according to several metrics. In order to evaluate the effect that de-identifying providers may have on data privacy, providers may be scored according to probabilistic data linkage and uniqueness criteria. Probabilistic data linkage may be used to evaluate providers by finding records that refer to the same entity across data sources. Probabilistic data linkage may be performed by provider evaluation module 160. During probabilistic data linkage, a dataset may be compared against a publicly available dataset (e.g., census information, telephone directories, etc.) as well as a data owner's other datasets. To evaluate a de-identification provider based on uniqueness criteria, provider evaluation module 160 may determine how unique each record would remain after the application of a de-identification provider, how easily the data could be re-identified, and what background knowledge might be required to fill in gaps. Each de-identification provider that is evaluated may receive a score corresponding to its effect on data privacy.

De-identification providers may also be evaluated according to the effect that the providers have on data utility. Provider evaluation module 160 may rank providers based on a general information loss metric and a workload-aware metric. A general information loss metric may be calculated for each provider by quantifying the distortion introduced to the dataset by the provider. A workload-aware metric may be determined by evaluating the effect that a de-identification provider may have on the ability of the resulting dataset to correctly support an analytic workload, when compared to the ability of the original dataset to support the same analytic workload. For example, average relative error (ARE) is a measure of data utility that averages relative error of various aggregate queries applied on data. Relative error may be measured according to how far a particular answer of a COUNT query is in anonymized data compared to the same query applied on the original data; the closer the two answers are, the higher the utility of a de-identified dataset.

One or more de-identification providers are recommended at operation 240. In some embodiments, the best de-identification providers are recommended based on their data privacy scores, data utility scores, or a combination of both. A privacy score may be computed according to the size of the smallest equivalence class, the change to the size of the smallest equivalence class before and after application of a provider, the distribution of the sizes of the equivalence classes, the number of quasi-identifying attributes and the possibility that these attributes are found in public datasets, population uniqueness criteria, etc. A utility score may be computed by comparing the performance of the de-identified dataset to a workload versus that of the original data, or by comparing the number of use-cases supported by the dataset before and after application of a provider. The recommendation may be presented to the data owner, who may then select a de-identification provider to apply to the dataset. Furthermore, each recommended anonymization technique may have several options that are presented to the data owner along with the effects of selecting those options.

The recommendations may be presented on a dashboard that enables a data owner to understand the effect that each different de-identification provider would have on their dataset. A data owner may also be warned that applying a particular de-identification provider may impact a dataset's utility to such an extent that the dataset will no longer support certain analytic tasks or use-cases. In some embodiments, any de-identification providers that would prevent a data owner from performing a particular analytic task or use-case on the dataset are not included in the recommendation. In some embodiments, any de-identification providers that block some analytic tasks or use-cases are highlighted so that the user is aware to avoid selecting them.

A selection of the de-identification providers is received at operation 250. In some embodiments, a user, such as the data owner, may select a de-identification provider recommended during operation 240. Provider evaluation module 160 may automatically select a de-identification provider based on the provider's data privacy score and data utility score relative to the other providers that were recommended at operation 240. A machine learning engine may be employed in order to automatically select a de-identification provider. The machine learning engine may be trained to select a provider based on a combination of the data privacy score and the data utility score. The machine learning engine may employ various models to perform the learning (e.g., neural networks, mathematical/statistical models, classifiers, etc.).

The selected de-identification provider is used to apply changes to a dataset at operation 260. In some embodiments, de-identification module 170 uses the de-identification provider selected by provider evaluation module 160 or a data owner during operation 250 to apply changes to the dataset.

Operation 270 determines whether the dataset is sufficiently de-identified. In some embodiments, a dataset's privacy metric is compared to a pre-defined threshold to determine whether the dataset is sufficiently de-identified. The threshold may be supplied by a data owner or may be required for the dataset to comply with a particular privacy regulation or standard. In one embodiment, a dataset's privacy metric is a number that corresponds to the size of the smallest equivalence class (e.g., the number of records having the same values for the quasi-identifiers) that was produced during de-identification. In some embodiments, the de-identification requirements of a legal framework, such as the Safe Harbor of the Health Insurance Portability and Accountability Act (HIPAA), or General Data Protection Regulation (GDPR) pseudonymization, are checked against the applied de-identification operations to the data to determine if the data are sufficiently protected under the corresponding legal framework.

If it is determined that the dataset has been sufficiently de-identified, then de-identification method 200 proceeds to operation 280 to output the de-identified dataset. If the dataset has not yet been sufficiently de-identified (e.g., its privacy metric does not meet the required threshold), then method 200 iterates by returning to operation 230, and the de-identification provider and corresponding configuration options that were used are removed from consideration by provider evaluation module 160. Since a previously-used de-identification provider is not included in additional repetitions of operations 230 through 260, the overall de-identification process is made more efficient by avoiding the redundant re-application of providers to a dataset, thus using fewer computing resources such as processing time and memory. De-identification method 200 may iterate multiple times until the dataset is sufficiently de-identified, which may be determined at operation 270.

The de-identified dataset is output at operation 280. The de-identified dataset may be stored in storage 180, database 120, or sent to user device 110. A user such as the data owner may interact with de-identified data on database 120 or storage 180 using user device 110.

Figure 3A:
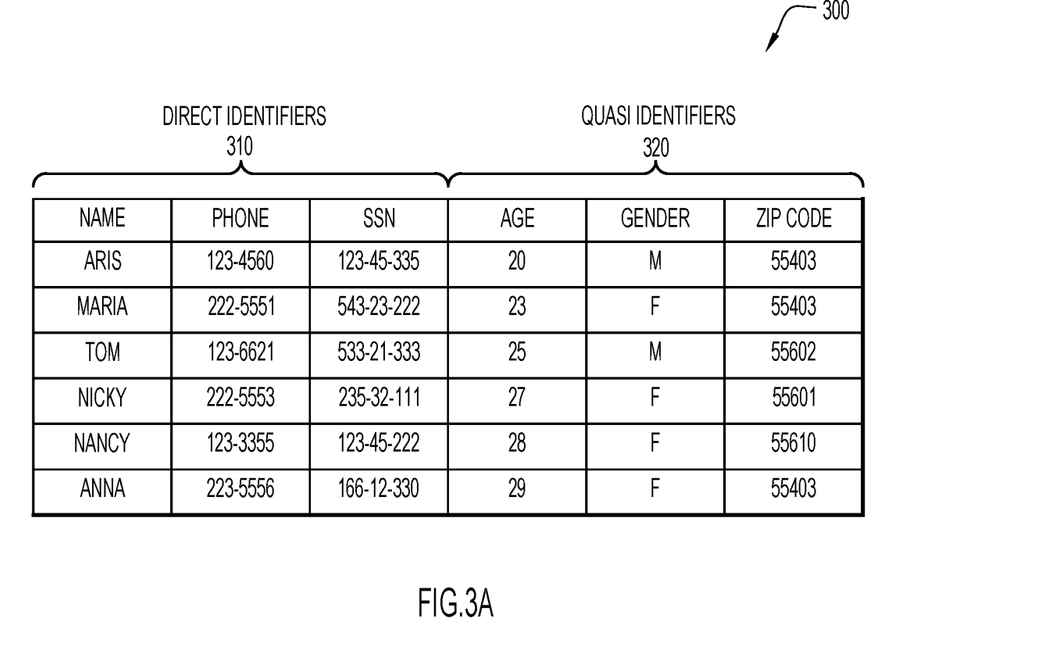
FIGS. 3A and 3B illustrate examples of a dataset for de-identification in accordance with an embodiment of the present invention.
Figure 3B:
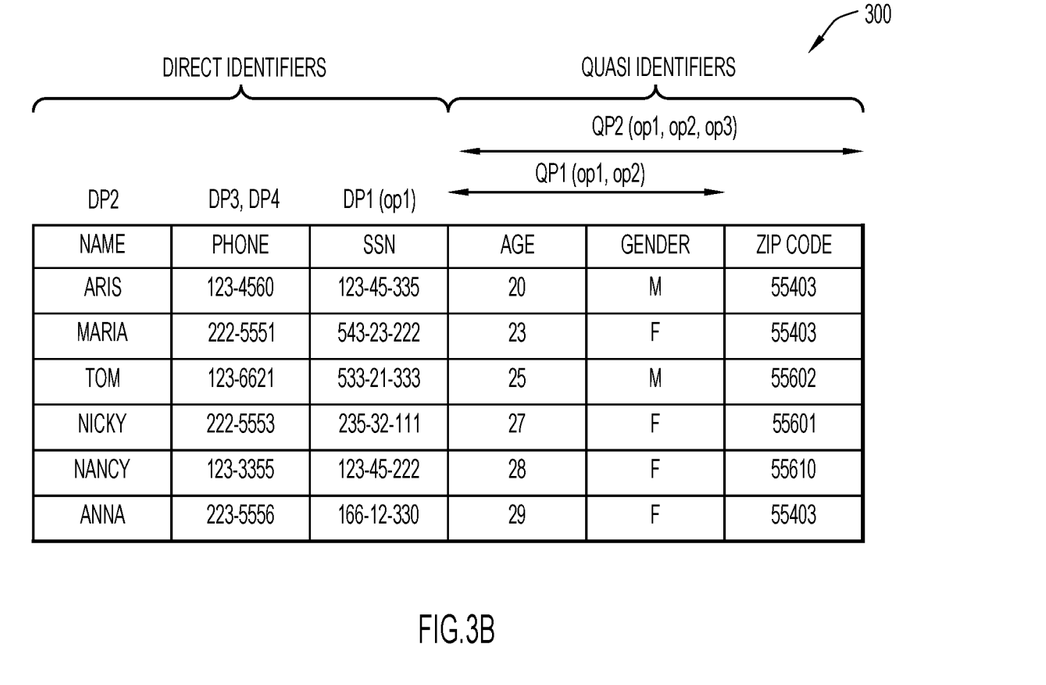

FIGS. 3A and 3B illustrate examples of a dataset for de-identification in accordance with an embodiment of the present invention. As depicted, FIGS. 3A and 3B include dataset 300 with direct identifiers 310 and quasi-identifiers 320. The fields and dimensions of dataset 300 are provided by way of example and are not intended to be limiting; datasets may be larger or smaller than dataset 300.

FIG. 3A depicts a dataset having direct identifiers 310 and quasi-identifiers 320. Direct identifiers 310 include the fields "NAME," "PHONE," AND "SSN." Quasi-identifiers 320 include the fields "AGE," "GENDER," and "ZIP CODE." FIG. 3B depicts dataset 300 as various de-identification providers are selected for the attributes of dataset 300. For example, de-identification provider DP2 may be initially selected for de-identifying direct identifiers in the "NAME" field; likewise, de-identification providers DP3 and DP4 may be selected for the "PHONE" field and de-identification providers DP1 with option 1 (op1) for the "SSN" field. De-identification provider QP1, with options op1 and op2, may be initially selected for de-identifying quasi-identifiers in the "AGE" and "GENDER" fields, and QP2, with options op1, op2, and op3, may be selected for de-identifying quasi-identifiers in the "AGE," "GENDER," and "ZIP CODE" fields. For example, these options may include an option for degree of de-identification (e.g., stricter de-identification at the expense of some data utility), an option for anonymizing according to the k-anonymity or the 1-diversity privacy model, an option to control the degree of value suppression or extent of value generalization, an option to use domain generalization hierarchies in the anonymization process, etc.

Figure 4A:
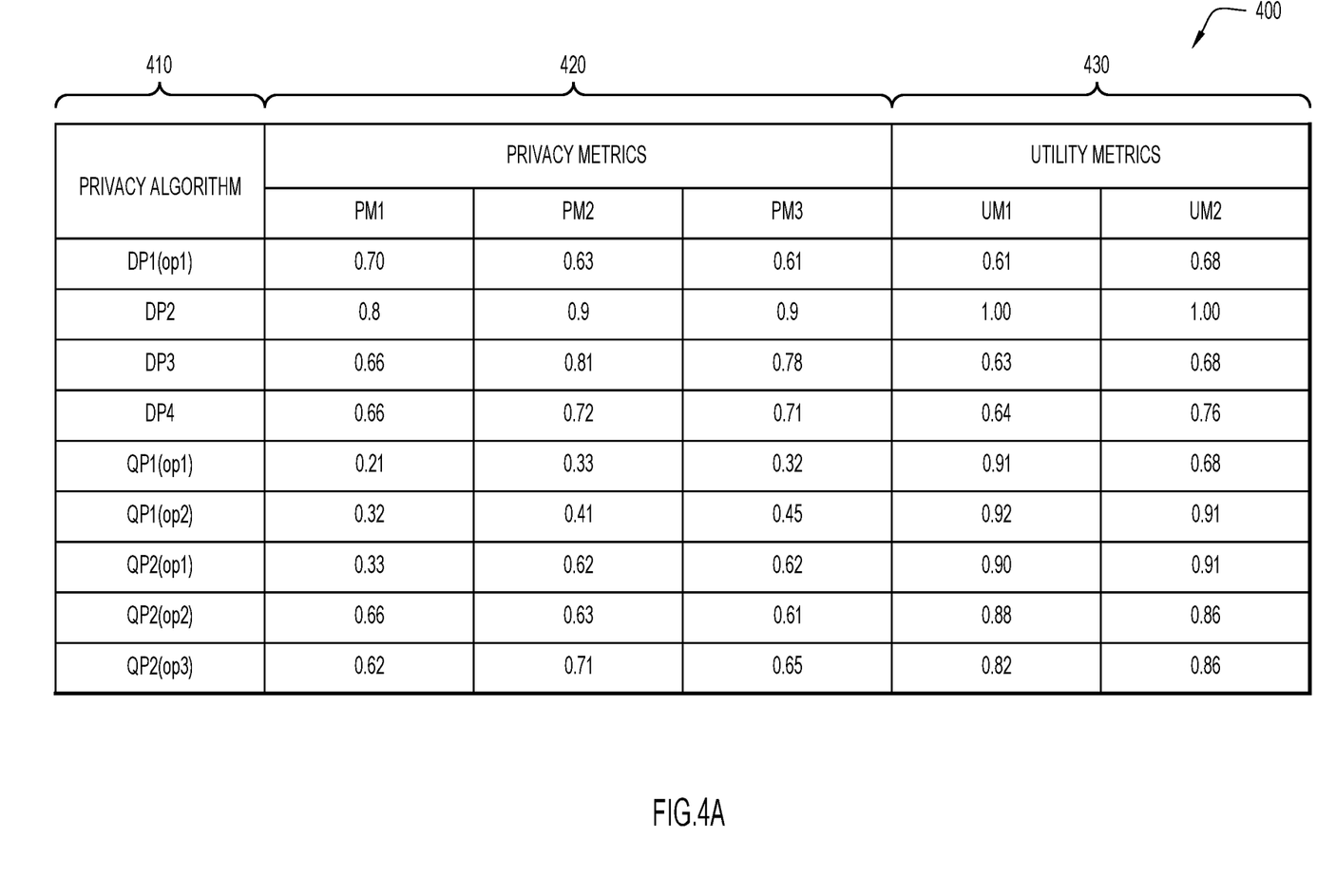
FIG. 4A illustrates an example of a de-identification algorithm evaluation table in accordance with an embodiment of the present invention

FIG. 4A illustrates an example of de-identification algorithm evaluation table 400 in accordance with an embodiment of the present invention. Evaluation table 400 may present an evaluation of the various de-identification providers selected in the example depicted in FIGS. 3A and 3B.

As depicted, evaluation table 400 includes a privacy algorithm field 410, privacy metrics field 420, and utility metrics field 430. Privacy algorithm field 410 may list various processes that are associated with attributes of the dataset and their respective configuration options. In some embodiments, the privacy processes correspond to de-identification providers selected by provider evaluation module 160 during operation 220 of method 200. Privacy metrics field 320 may include subsections that correspond to specific measures of the effects that each algorithm has on a dataset's privacy, such as probabilistic data linkage and uniqueness criteria. Utility metrics field 430 may include subsections that correspond to specific measures of the effects that each process has on the dataset's utility. Each privacy metric and utility metric may be represented as a score that correlates to the selected algorithm's effect on data privacy or utility.

In some embodiments, an evaluation of the de-identification providers, such as evaluation 400, is presented to a data owner, who may then select a provider based on the presented metrics. In some embodiments, the provider whose de-identification process offers the best benefits to privacy at the least expense to utility is selected automatically. For example, provider evaluation module 160 may select DP2, as it has higher privacy metric and utility metric scores compared to the other providers' algorithms in evaluation table 400, meaning that DP2 minimizes privacy vulnerabilities in the dataset with very little impact to data utility. Selection of de-identification provider DP2 may correspond to operation 250 of de-identification method 200. A machine learning engine may be employed in order to automatically select a de-identification provider. The machine learning engine may be trained to select a provider based on a combination of the data privacy score and the data utility score. The machine learning engine may employ various models to perform the learning (e.g., neural networks, mathematical/statistical models, classifiers, etc.).

In some embodiments, evaluation 400 is presented to a data owner in the form of a dashboard. A dashboard may include visualizations of the effects that each de-identification provider would have when applied to the data owner's dataset. By presenting privacy and utility metrics in a dashboard format, a data owner may easily understand effects of different algorithms in order to select the desired algorithm and configuration options.

Figure 4B:
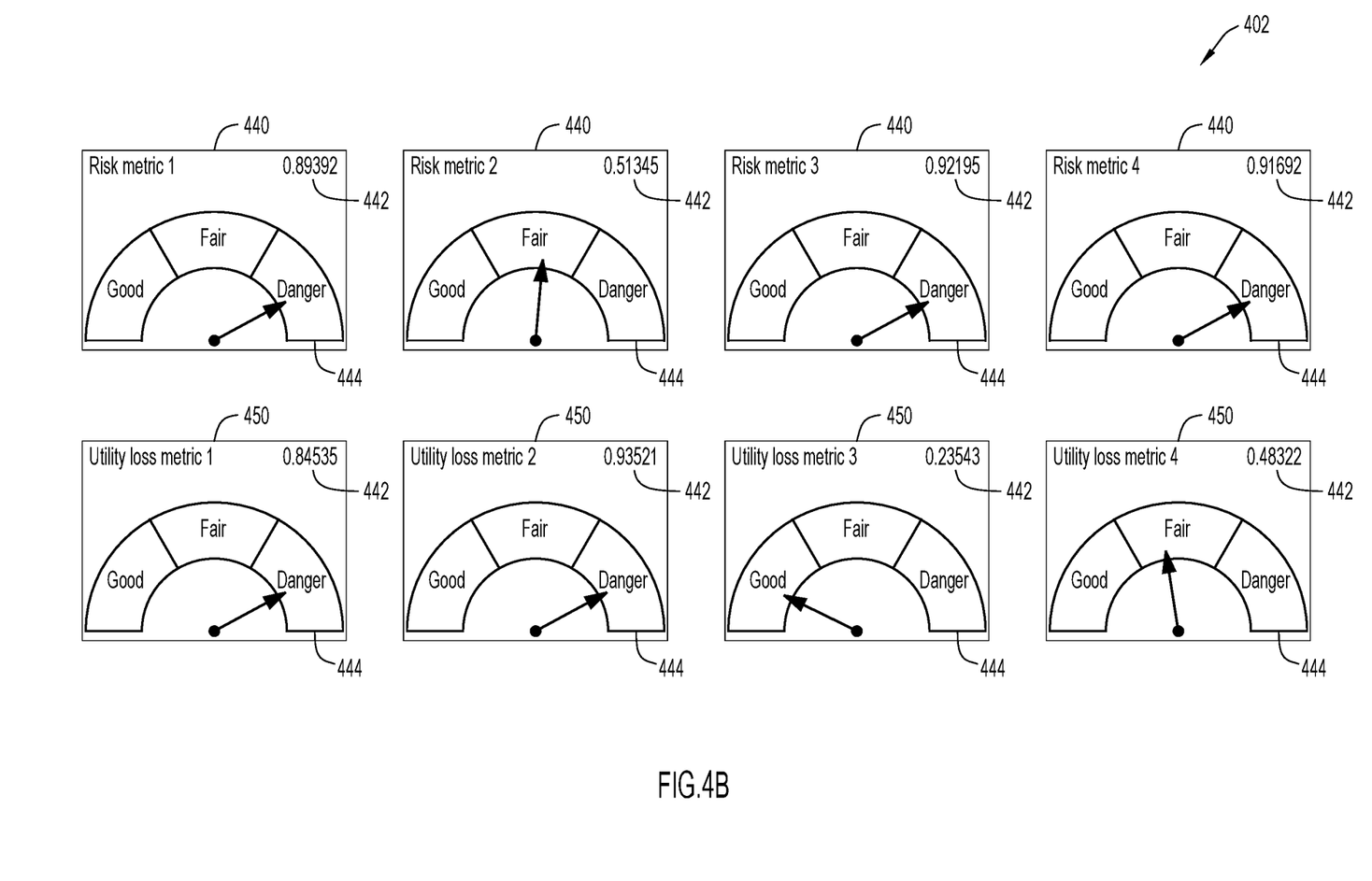
FIG. 4B illustrates an example of a single de-identification provider evaluation dashboard in accordance with an embodiment of the present invention.

FIG. 4B illustrates an example of a single de-identification provider evaluation dashboard 402 in accordance with an embodiment of the present invention. Single de-identification provider evaluation dashboard 402 presents an evaluation to a user of a single de-identification provider's effect on a particular attribute (or merged combination of attributes), as calculated by various metrics. Single de-identification provider evaluation dashboard 402 includes risk metric panes 440, each of which displays a particular risk metric measuring the effect of applying a de-identification provider to an attribute by displaying a data privacy score 442 and privacy risk dial indicator 444. Single de-identification provider evaluation dashboard 402 also includes utility loss metric panes 450, each of which displays a particular utility loss metric measuring the effects of applying a de-identification provider to an attribute by displaying a utility loss score 452 and utility loss dial indicator 454. A user, such as a data owner, may view and interact with single de-identification provider evaluation dashboard 402 using a device such as user device 110. Provider evaluation module 160 may generate and update single de-identification provider evaluation dashboard 402.

Data privacy score 442 may indicate a numerical value associated with the application of a particular de-identification provider in terms of its effect on a dataset's privacy risk, and may be calculated according to such metrics as probabilistic data linkage and/or uniqueness criteria. As depicted, a higher data privacy score 442 (e.g. closer to 1.0) may be associated with a higher risk, and a lower score (e.g., closer to zero) may be associated with a lower risk. Each privacy risk dial indicator 444 may display a visual representation of each data privacy score 442.

Utility loss score 452 may indicate a numerical value associated with the application of a particular de-identification provider in terms of its effect on a dataset's utility, and may be calculated according to such metrics as a general information loss metric and a workload-aware metric. As depicted, a higher utility loss score 452 (e.g., closer to 1.0) may correspond to a greater loss of data utility, and a lower score (e.g., closer to zero) may correspond to a lesser loss of data utility. Each utility loss dial indicator 454 may display a visual representation of each utility loss score 452.

Figure 4C:
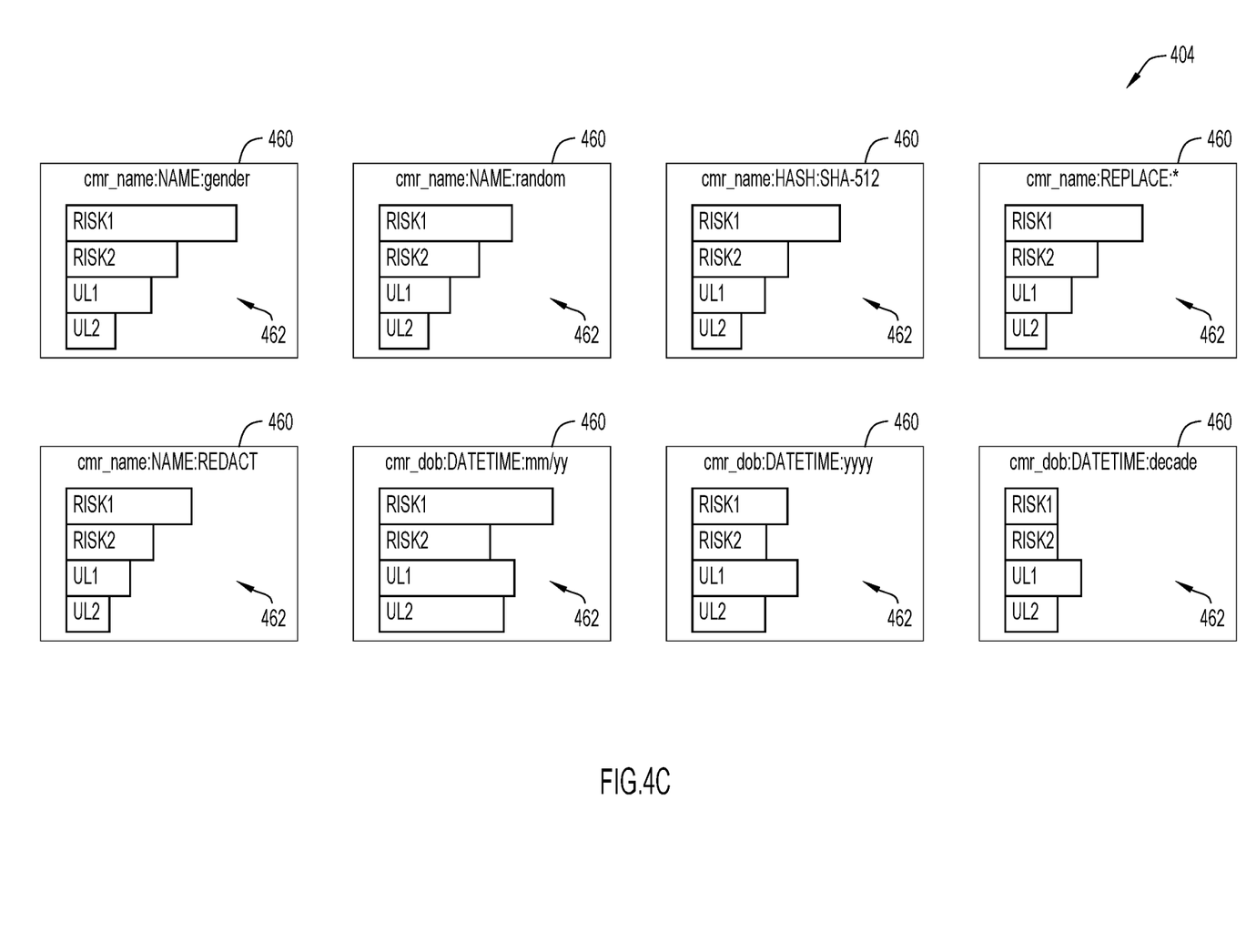
FIG. 4C illustrates an example of a multiple de-identification provider evaluation dashboard in accordance with an embodiment of the present invention.

FIG. 4C illustrates an example of a multiple de-identification provider evaluation dashboard 404 in accordance with an embodiment of the present invention. Multiple de-identification provider evaluation dashboard 404 presents an evaluation to a user of various de-identification providers as applied to many different attributes in one display. As depicted, multiple de-identification provider evaluation dashboard 404 includes attribute panes 460 and corresponding bar charts 462. A user, such as a data owner, may view and interact with multiple de-identification provider evaluation dashboard 404 using a device such as user device 110. Provider evaluation module 160 may generate and update multiple de-identification provider evaluation dashboard 404.

Each attribute pane 460 may show the effect of a particular de-identification provider as applied to a particular attribute. For example, "cmr_name:NAME:gender" may represent a provider that de-identifies the name while preserving gender information (so that male names are replaced with other male names, and female names are replaced with other female names from a list), whereas "cmr_name:NAME:random" may represent a provider that replaces a name with a randomly-selected name without guaranteeing gender preservation. Each bar chart 462 may illustrate the effects of applying the de-identification provider to an attribute, as measured by a particular metric, to generate one or more data privacy scores and/or utility loss scores. Multiple de-identification provider evaluation module 404 may also indicate which provider is optimal to apply to a particular attribute by highlighting one or more attribute panes 460.

Figure 5:
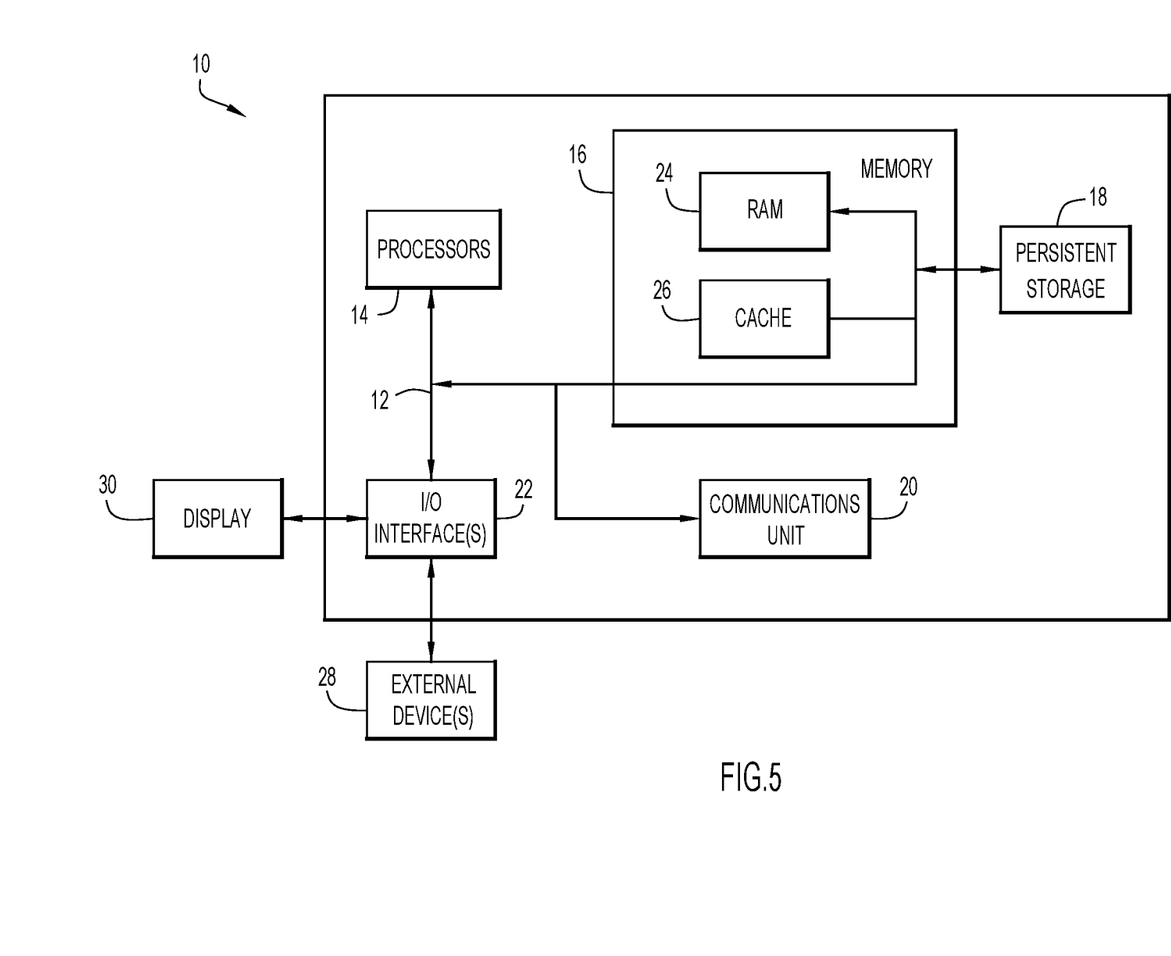
FIG. 5 is a block diagram depicting a computing device in accordance with an embodiment of the present invention.

FIG. 5 is a block diagram depicting components of a computer 10 suitable for executing the methods disclosed herein. Computer 10 may enable user device 110, database 120, and server 140 to perform data de-identification in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data in any dataset, whether de-identified not, may be stored within any conventional or other data structures (e.g., files, arrays, lists, stacks, queues, records, etc.) and may be stored in any desired storage unit (e.g., database, data or other repositories, queue, etc.) The data transmitted between user device 110, database 120, and server 140 may include any desired format and arrangement, and may include any quantity of any types of fields of any size to store the data. The definition and data model for any datasets may indicate the overall structure in any desired fashion (e.g., computer-related languages, graphical representation, listing, etc.).

Data in a dataset may include any information provided by user device 110, database 120, and storage 180. Data in a dataset may include any desired format and arrangement, and may include any quantity of any types of fields of any size to store any desired data. The fields may indicate the presence, absence, actual values, or any other desired characteristics of the data of interest (e.g., quantity, value ranges, etc.). Data in a dataset may include all or any desired portion (e.g., any quantity of specific fields) of personal information (PI) or other data of interest within a given implementation or system. Data in a dataset may indicate the overall structure in any desired fashion (e.g., computer-related languages, graphical representation, listing, etc.). The fields for the dataset may be selected automatically (e.g., based on metadata, common or pre-defined models or structures, etc.) or manually (e.g., pre-defined, supplied by a data owner, etc.) in any desired fashion for a particular implementation or system. Metadata (e.g., for field selection, dataset properties etc.) may include any suitable information providing a description of fields or information (e.g., description of content, data type, etc.).

The data in a dataset may include any data collected about entities by any collection mechanism, any combination of collected information, any information derived from analyzing collected information, and any combination data before or after de-identification.

The present invention embodiments may employ any number of any type of user interface (e.g., Graphical User Interface (GUI), command-line, prompt, etc.) for obtaining or providing information (e.g., data in a dataset), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for generation and analysis of various types of data, even in the absence of that data. For example, present invention embodiments may be utilized for any types of data interest (e.g., sensitive data (personal information (PI) including information pertaining to patients, customers, suppliers, citizens, and/or employees, etc.) non-sensitive data, data that may become unavailable (e.g., data that is subject to deletion after retention for a minimum time interval (e.g., information subject to various regulations, etc.), information that becomes unavailable due to system outage, power failure, or other data loss, etc.), etc.). Further, present invention embodiments may generate and utilize any quantity of data regarding entities of interest.

It will be appreciated that the embodiments described above and illustrated in the drawings represent only a few of the many ways of implementing embodiments for iterative execution of data de-identification processes.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, vulnerability analysis module 150, provider evaluation module 160, de-identification module 170, etc.). These systems may include any types of monitors and input devices (e.g., keyboard, mouse, voice recognition, etc.) to enter and/or view information.

It is to be understood that the software (e.g., client software, server software, communication software, vulnerability analysis module 150, provider evaluation module 160, de-identification module 170, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., vulnerability analysis module 150, provider evaluation module 160, de-identification module 170, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardware, wireless link, Intranet, etc.).

The system may employ any number of any conventional or other databases, data stores or storage structures (e.g., files, databases, data structures, data or other repositories, etc.) to store information (e.g., data in a dataset). The database system may be implemented by any number of any conventional or other databases, data stores or storage structures (e.g., files, databases, data structures, data or other repositories, etc.) to store information (e.g., data in a dataset). The database system may be included within or coupled to the server and/or client systems. The database systems and/or storage structures may be remote from or local to the computer or other processing systems, and may store any desired data (e.g., data in a dataset).

The present invention embodiments may employ any number of any type of user interface (e.g., Graphical User Interface (GUI), command-line, prompt, etc.) for obtaining or providing information (e.g., data in a dataset), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer system for de-identifying data, the computer system comprising:
one or more computer processors;
one or more computer readable storage media;
program instructions stored on the one or more computer readable storage media for execution by at least one of the one or more computer processors, the program instructions comprising instructions to:
select a plurality of attributes of a dataset;
determine a set of data de-identification techniques, including one or more data de-identification techniques for each attribute of the plurality of attributes;
evaluate each data de-identification technique with respect to an impact on data privacy and an impact on data utility based on a series of metrics;
recommend a data de-identification technique for each attribute based on the evaluation, wherein the recommended data de-identification technique for each attribute is presented using a user interface dashboard that indicates a plurality of privacy metrics and a plurality of utility metrics resulting from applying the recommended data de-identification technique, and wherein the user interface dashboard indicates the plurality of privacy metrics and the plurality of utility metrics for each attribute of the plurality of attributes;
apply the recommended data de-identification technique for each attribute to de-identify the dataset;
remove each applied data de-identification technique from the recommended data de-identification techniques to be applied to the dataset;
re-evaluate remaining data de-identification techniques for selected attributes of the de-identified data set with respect to an impact on data privacy and an impact on data utility based on the series of metrics;

recommend a second data de-identification technique for each selected attribute of the de-identified data set, wherein the recommended second data de-identification technique for each attribute is presented using the user interface dashboard that indicates the plurality of privacy metrics and the plurality of utility metrics resulting from applying the recommended second data de-identification technique, and wherein the user interface dashboard indicates the plurality of privacy metrics and the plurality of utility metrics for each selected attribute of the selected attributes; and apply the recommended second data de-identification technique for each selected attribute of the de-identified data set to further de-identify the dataset.

2. The computer system of claim 1, further comprising program instructions to:

present the de-identified data set and recommended data de-identification techniques and corresponding configuration options on the user interface dashboard.

3. The computer system of claim 1, wherein one or more of the plurality of attributes include a direct identifier associated with one or more of a set of data masking techniques, a set of data pseudonymization techniques, and a set of data encryption techniques.

4. The computer system of claim 1, wherein one or more of the plurality of selected attributes include a set of quasi-identifiers associated with a set of data anonymization techniques.

5. The computer system of claim 1, wherein metrics associated with data privacy include probabilistic data linkage against one or more datasets from a group of publicly available datasets and user provided datasets, and uniqueness criteria of the dataset.

6. The computer system of claim 1, wherein metrics associated with data utility include data distortion introduced into the dataset by a data de-identification technique and workload-aware metrics that capture usefulness of the de-identified data in supporting certain types of analyses.

7. The computer system of claim 1, wherein a metric associated with data utility comprises an average relative error metric.

8. A computer program product for de-identifying data, the computer program product comprising one or more computer readable storage media collectively having program instructions embodied therewith, the program instructions executable by a computer to cause the computer to:

select a plurality of attributes of a dataset;

determine a set of data de-identification techniques, including one or more data de-identification techniques for each attribute of the plurality of attributes;

evaluate each data de-identification technique with respect to an impact on data privacy and an impact on data utility based on a series of metrics;

recommend a data de-identification technique for each attribute based on the evaluation, wherein the recommended data de-identification technique for each attribute is presented using a user interface dashboard that indicates a plurality of privacy metrics and a plurality of utility metrics resulting from applying the recommended data de-identification technique, and wherein the user interface dashboard indicates the plurality of privacy metrics and the plurality of utility metrics for each attribute of the plurality of attributes;

apply the recommended data de-identification technique for each attribute to de-identify the dataset;

remove each applied data de-identification technique from the recommended data de-identification techniques to be applied to the dataset;

re-evaluate remaining data de-identification techniques for selected attributes of the de-identified data set with respect to an impact on data privacy and an impact on data utility based on the series of metrics;

recommend a second data de-identification technique for each selected attribute of the de-identified data set, wherein the recommended second data de-identification technique for each attribute is presented using the user interface dashboard that indicates the plurality of privacy metrics and the plurality of utility metrics resulting from applying the recommended second data de-identification technique, and wherein the user interface dashboard indicates the plurality of privacy metrics and the plurality of utility metrics for each selected attribute of the selected attributes; and apply the recommended second data de-identification technique for each selected attribute of the de-identified data set to further de-identify the dataset.

9. The computer program product of claim 8, wherein the program instructions further cause the computer to:

present the de-identified data set and recommended data de-identification techniques and corresponding configuration options on the user interface dashboard.

10. The computer program product of claim 8, wherein one or more of the plurality of attributes include a direct identifier associated with one or more of a set of data masking techniques, a set of data pseudonymization techniques, and a set of data encryption techniques.

11. The computer program product of claim 8, wherein one or more of the plurality of attributes include a set of quasi-identifiers associated with a set of data anonymization techniques.

12. The computer program product of claim 8, wherein metrics associated with data privacy include probabilistic data linkage against one or more datasets from a group of publicly available datasets and user provided datasets, and uniqueness criteria of the dataset.

13. The computer program product of claim 8, wherein metrics associated with data utility include data distortion introduced into the dataset by a data de-identification technique and workload-aware metrics that capture usefulness of the de-identified data in supporting certain types of analyses.

14. The computer program product of claim 8, wherein a metric associated with data utility comprises an average relative error metric.

* * * * *